(12) United States Patent
Maldonado

(10) Patent No.: US 10,512,837 B2
(45) Date of Patent: Dec. 24, 2019

(54) PORTABLE ENTERTAINMENT SYSTEM

(71) Applicant: Franklin Maldonado, Fiskdale, MA (US)

(72) Inventor: Franklin Maldonado, Fiskdale, MA (US)

( * ) Notice: Subject to any disclaimer, the term of this patent is extended or adjusted under 35 U.S.C. 154(b) by 375 days.

(21) Appl. No.: 15/268,236

(22) Filed: Sep. 16, 2016

(65) Prior Publication Data
US 2018/0078852 A1     Mar. 22, 2018

(51) Int. Cl.
| | | |
|---|---|---|
| A63F 13/24 | (2014.01) | |
| G06F 1/16 | (2006.01) | |
| A63F 13/25 | (2014.01) | |
| A63F 13/92 | (2014.01) | |
| A63F 13/235 | (2014.01) | |
| A63F 13/98 | (2014.01) | |
| H04W 4/80 | (2018.01) | |
| H04M 1/04 | (2006.01) | |
| H04M 1/725 | (2006.01) | |

(52) U.S. Cl.
CPC .............. *A63F 13/24* (2014.09); *A63F 13/25* (2014.09); *G06F 1/1632* (2013.01); *A63F 13/235* (2014.09); *A63F 13/92* (2014.09); *A63F 2300/1031* (2013.01); *H04M 1/04* (2013.01); *H04M 1/72544* (2013.01); *H04W 4/80* (2018.02)

(58) Field of Classification Search
CPC ........ A63F 13/24; A63F 13/25; A63F 13/235; A63F 13/92; A63F 13/98; G06F 1/1632; G06F 1/16
See application file for complete search history.

(56) References Cited

U.S. PATENT DOCUMENTS

| | | | | |
|---|---|---|---|---|
| 9,539,507 | B2 * | 1/2017 | Schoenith | A63F 13/98 |
| 2013/0154542 | A1 * | 6/2013 | Joynes | H02J 7/0042 |
| | | | | 320/101 |
| 2014/0315640 | A1 * | 10/2014 | Goh | G06F 3/0202 |
| | | | | 463/37 |
| 2015/0273325 | A1 * | 10/2015 | Falc | G06F 1/1626 |
| | | | | 463/37 |
| 2016/0030835 | A1 * | 2/2016 | Argiro | A63F 13/02 |
| | | | | 463/33 |
| 2017/0136354 | A1 * | 5/2017 | Yamano | G06F 3/16 |
| 2017/0182409 | A1 * | 6/2017 | Townley | A63F 13/24 |

FOREIGN PATENT DOCUMENTS

EP          3103529 A2 * 12/2016 ........... G06F 1/1684

* cited by examiner

*Primary Examiner* — David Duffy
*Assistant Examiner* — Ankit B Doshi

(57) ABSTRACT

A portable entertainment system is created from a base unit, a handheld controller, and a remote computing device. The base unit includes a universal docking system to receive the remote computing device and a controller dock to receive the handheld controller. Several electronic systems allow for multimedia inputs and outputs to be obtained through the base unit. The base unit also acts as an access point, thanks to Ethernet and wireless capabilities. The handheld controller has several ergonomic improvements, including finger grooves along a bottom portion and elliptical shaped rests that are better adapted to the natural contours of a person's finger. Improved triggers are also provided; a reverse trigger system allows users to easily slide their fingers along a lower trigger to an adjacent upper trigger.

12 Claims, 19 Drawing Sheets

PORTABLE ENTERTAINMENT SYSTEM

FIELD OF THE INVENTION

The present invention relates generally to a system for interfacing electronic devices to create an adaptable and portable entertainment system.

BACKGROUND OF THE INVENTION

Since the introduction of computers the entertainment sector has seen offerings progress from single purpose devices to all-in-one solutions. It is no longer enough to offer only a dock, or a gaming solution. Rather consumers demand an entire entertainment system with multiple applications.

The present invention seeks to offer such a solution by combining several electronics that allow for both gaming and multimedia playback, amongst other capabilities. The present invention introduces a base unit, a handheld controller, and a remote computing device which can interact in several ways with smartphone devices to support the aforementioned features. The base unit is able to support both the handheld controller and the remote computing device. In which, the remote computing device (smart remote control) is held (docked) into the handheld controller, which serves as the brains of the handheld controller. This allows for charging of the handheld controller, and a remote computing device which enables interaction with smartphone devices. This also enables outputting multimedia from the remote computing device to connected systems, such as televisions and speakers.

The handheld controller interfaces with the remote computing device to enable gameplay, for example, with visual data being displayed through the remote computing device. However, the whole purpose of the present invention is the actual interactivity and unification with a smartphone or tablet device, achieved thanks to both direct and indirect (i.e. wired or wireless) connections between the handheld controller and the base unit as well as receptacles for said smartphone or tablet. The handheld controller also emphasizes ergonomic improvements, providing elliptical grooves along several inputs which are more comfortable for a person's fingers.

The improvements offered by the present invention are further detailed and expanded upon below.

DETAIL DESCRIPTIONS OF THE INVENTION

Figure 1:
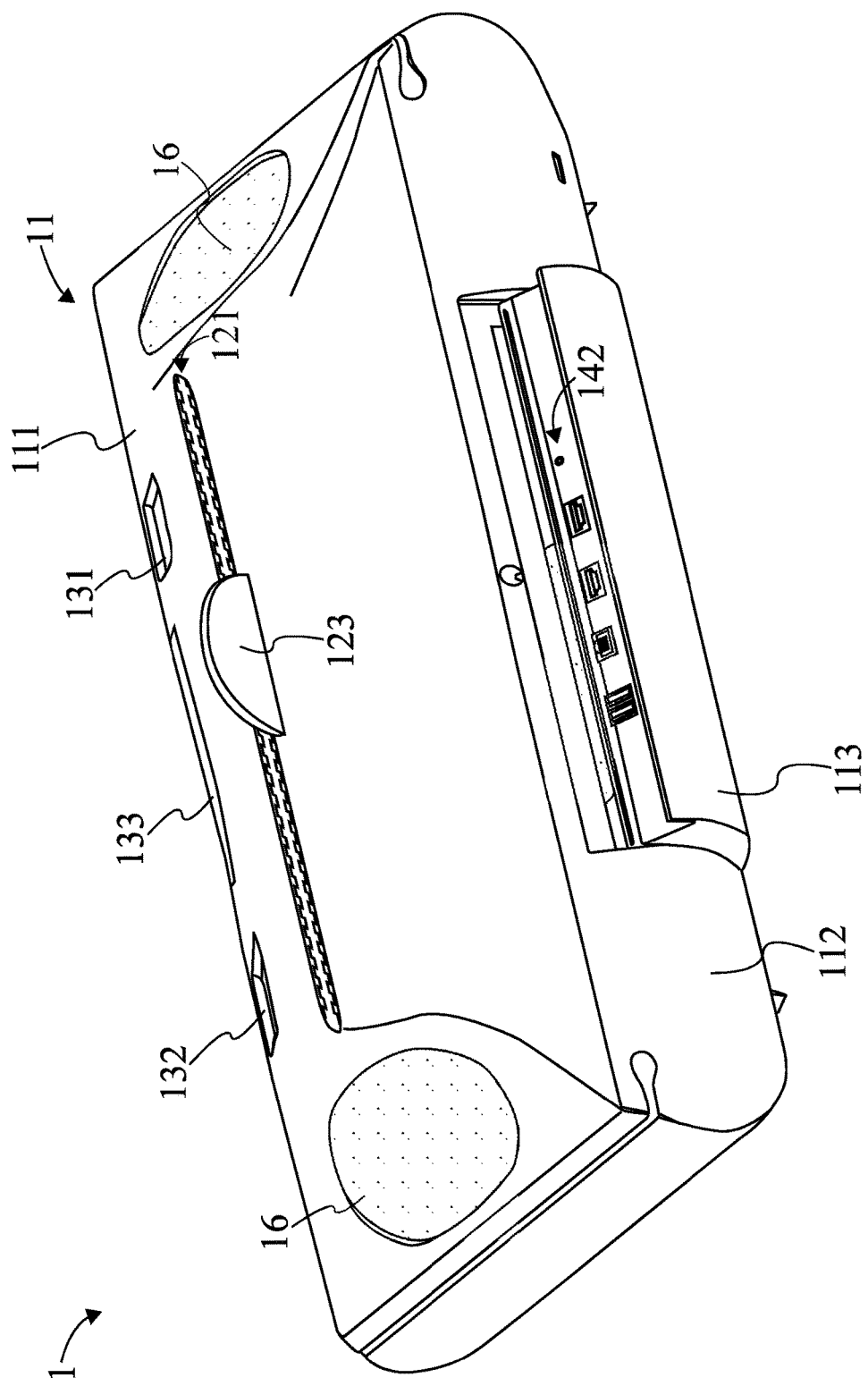
FIG. 1 is a perspective view showing a base unit of the present invention.
Figure 2:
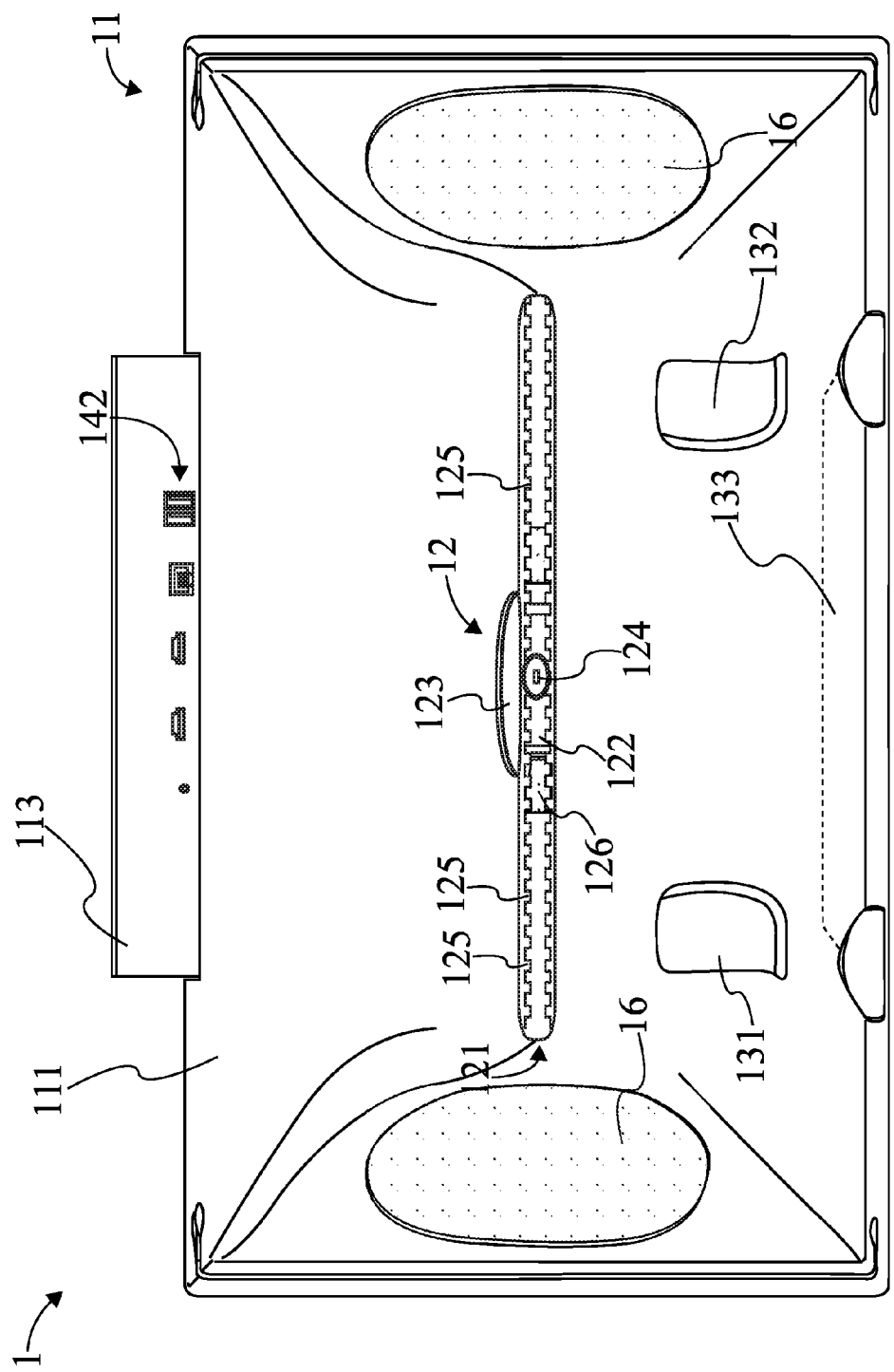
FIG. 2 is a top plan view thereof.
Figure 3:
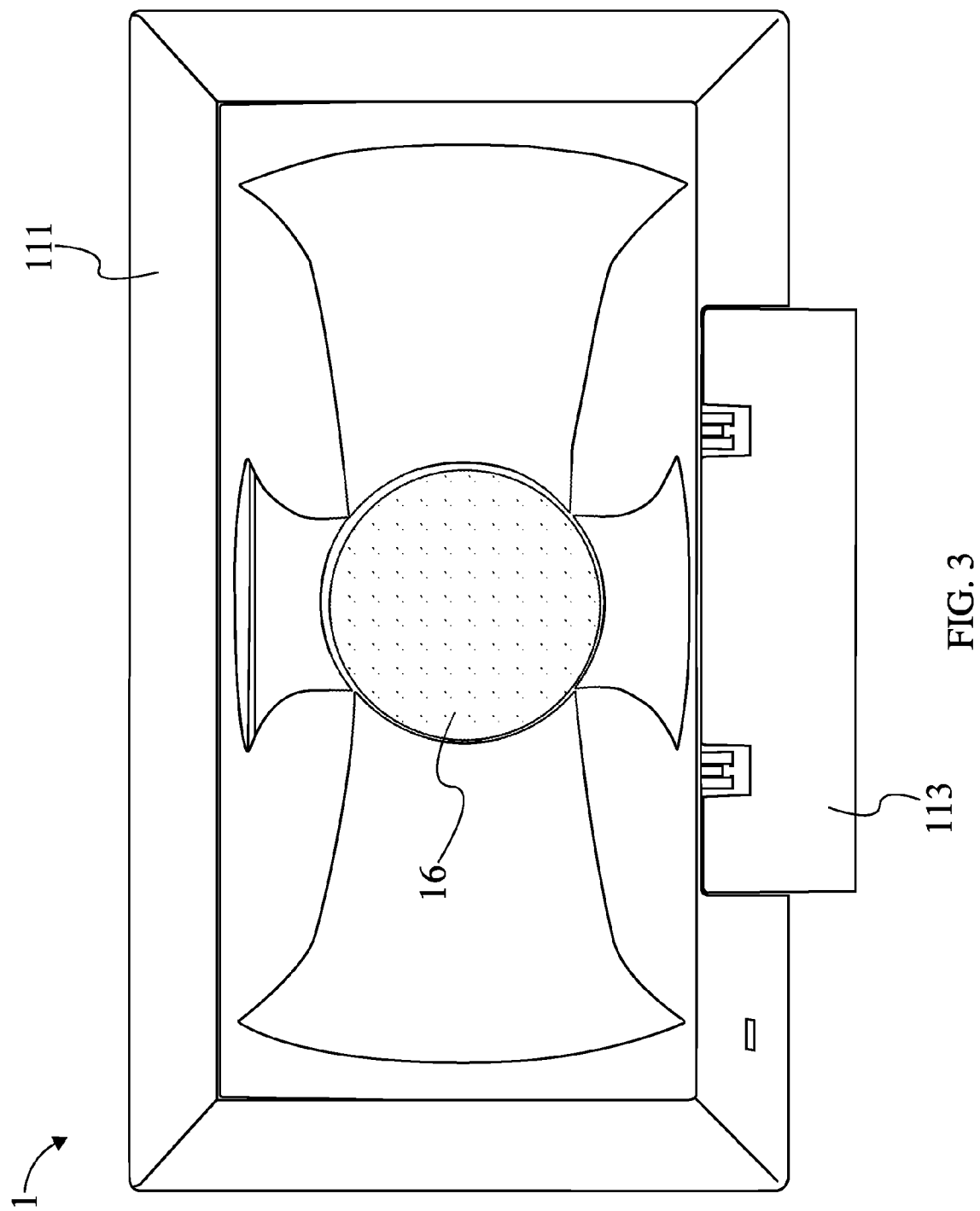
FIG. 3 is a bottom plan view thereof.
Figure 4:
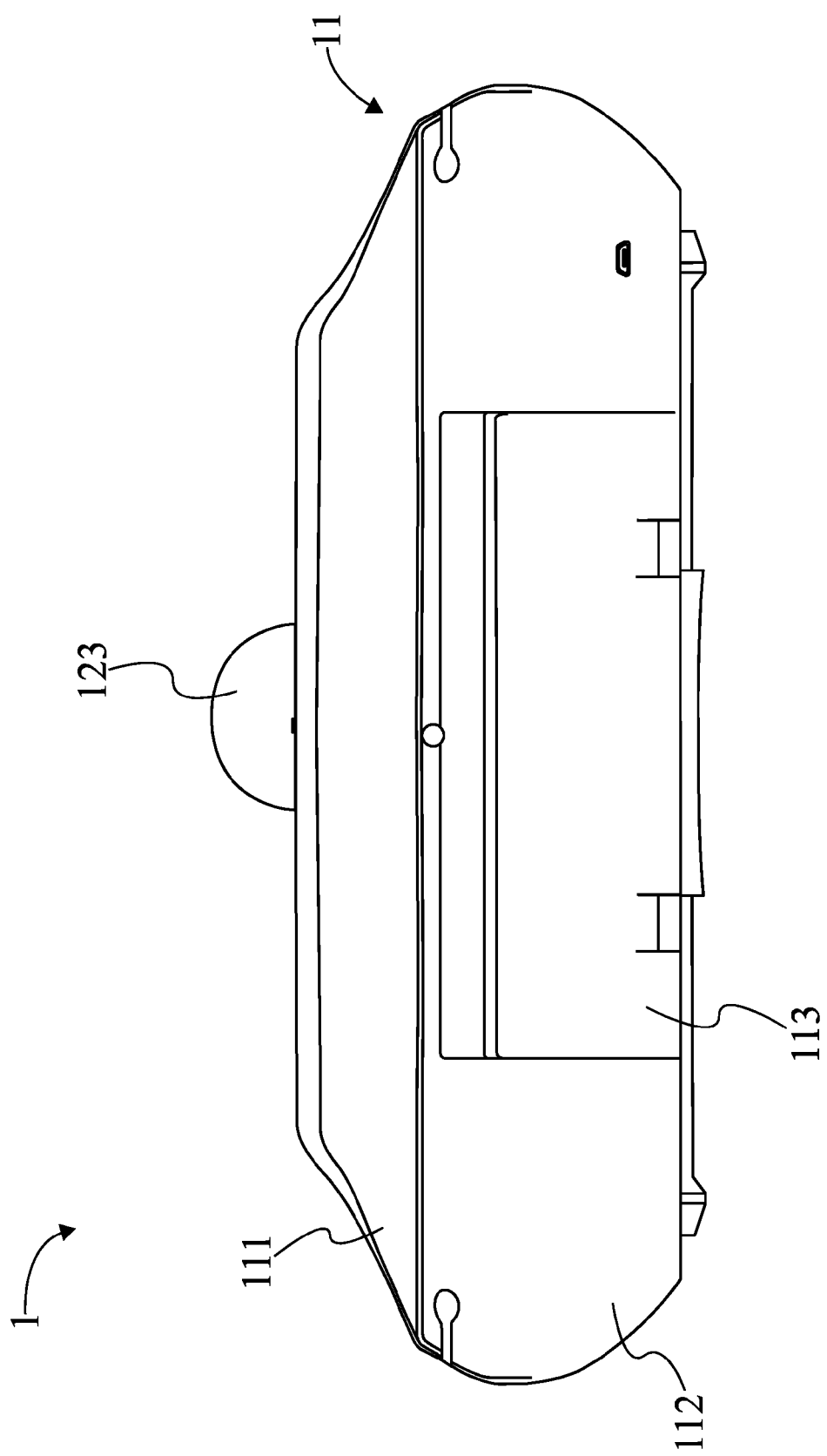
FIG. 4 is a rear elevational view thereof, showing a charging port that receives a male connector and a lighting connection array around the base that illuminates the components of the present invention.
Figure 5:
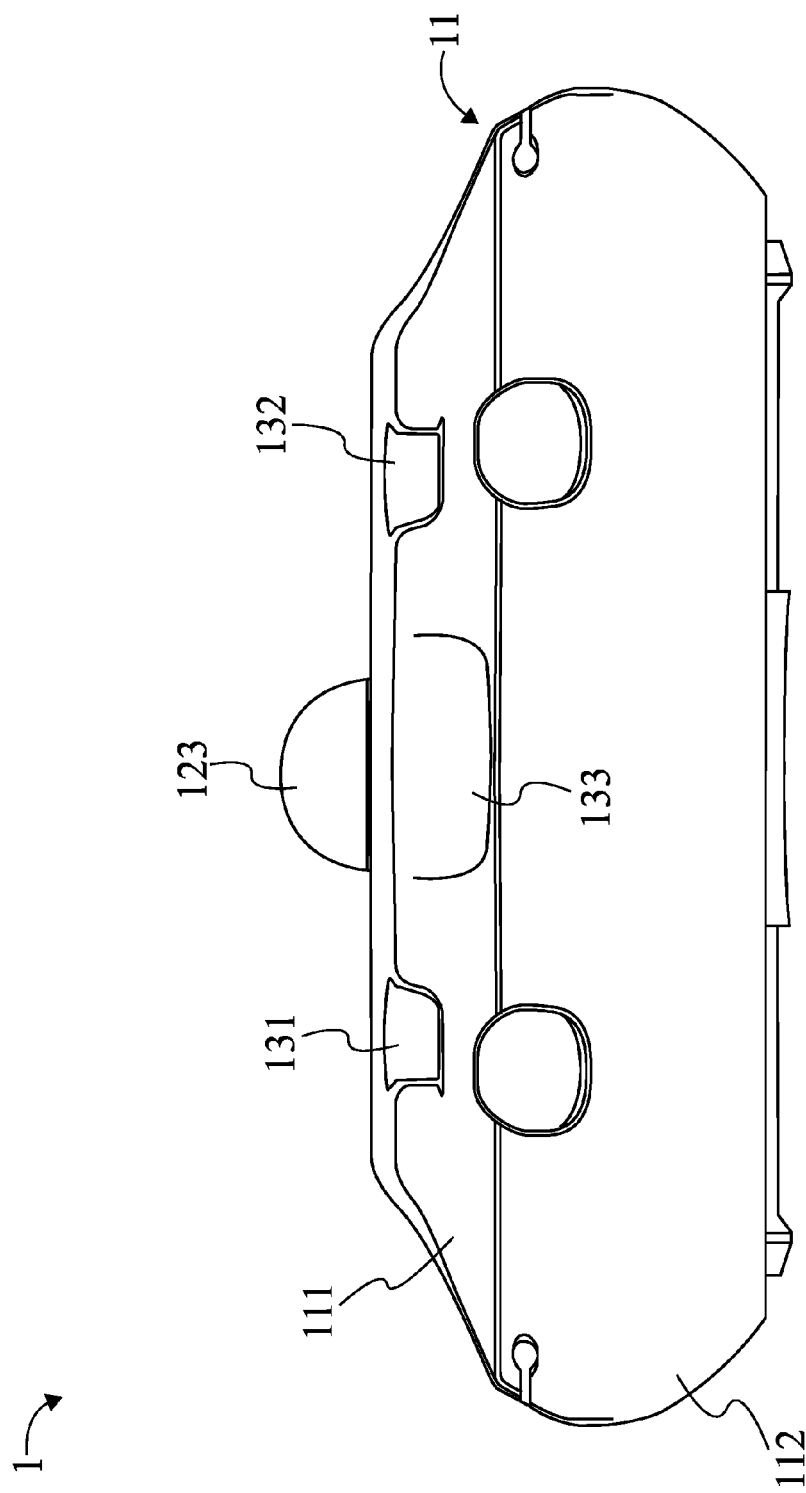
FIG. 5 is a front elevational view thereof.
Figure 6:
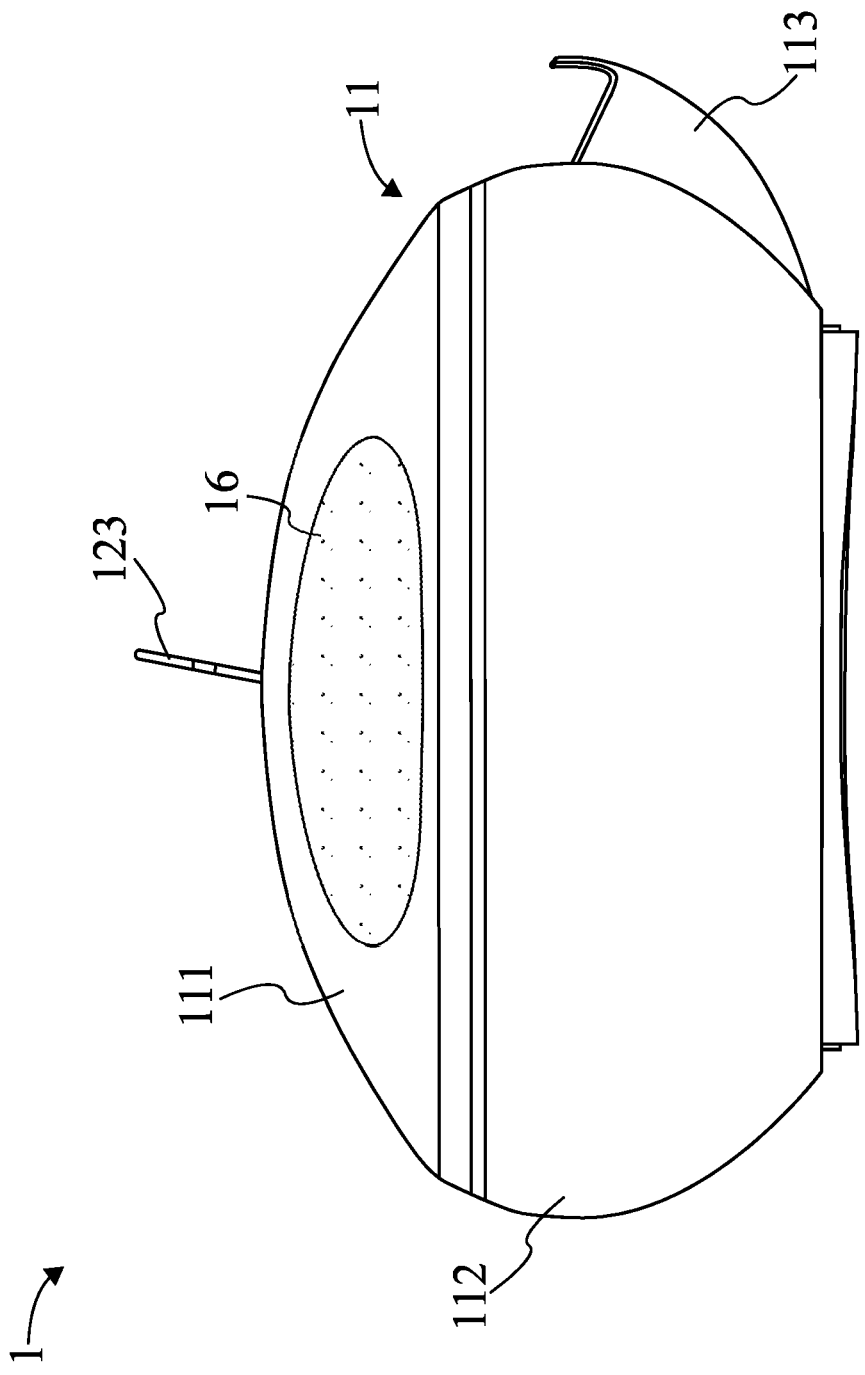
FIG. 6 is a right-side elevational view thereof.
Figure 7:
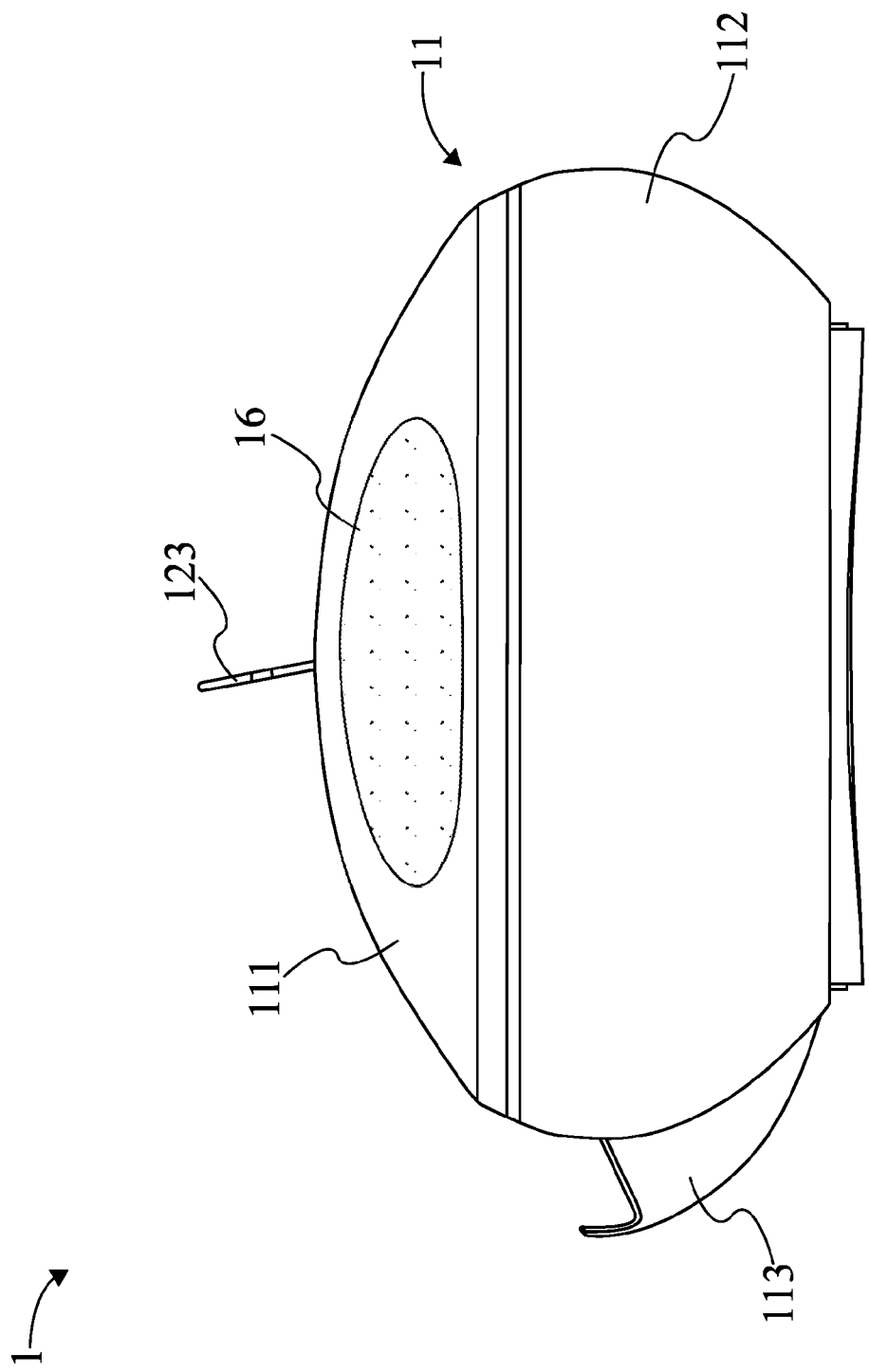
FIG. 7 is a left-side elevational view thereof.
Figure 8:
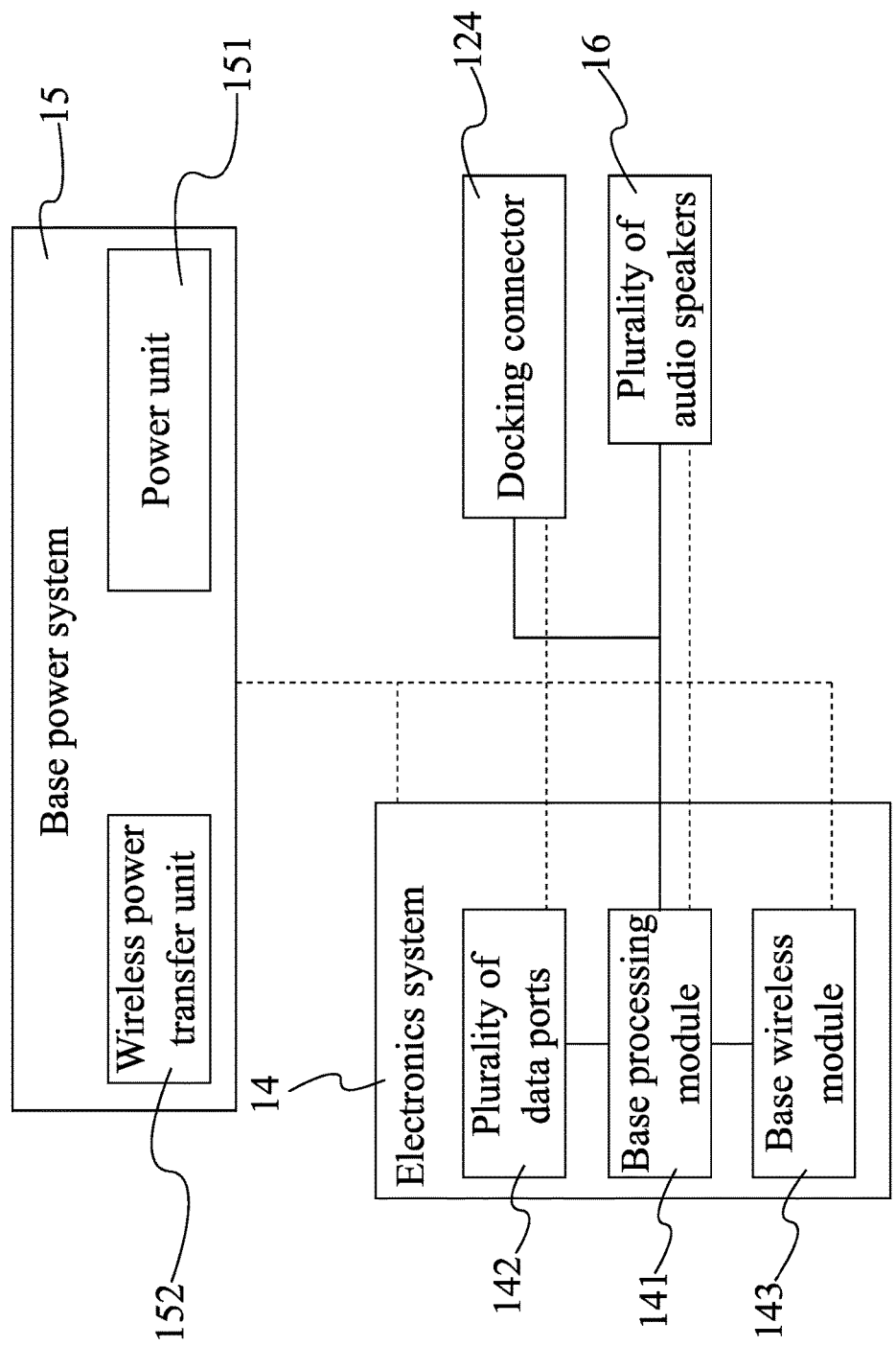
FIG. 8 is a diagram showing electrical and electronic connections of the base unit.
Figure 9:
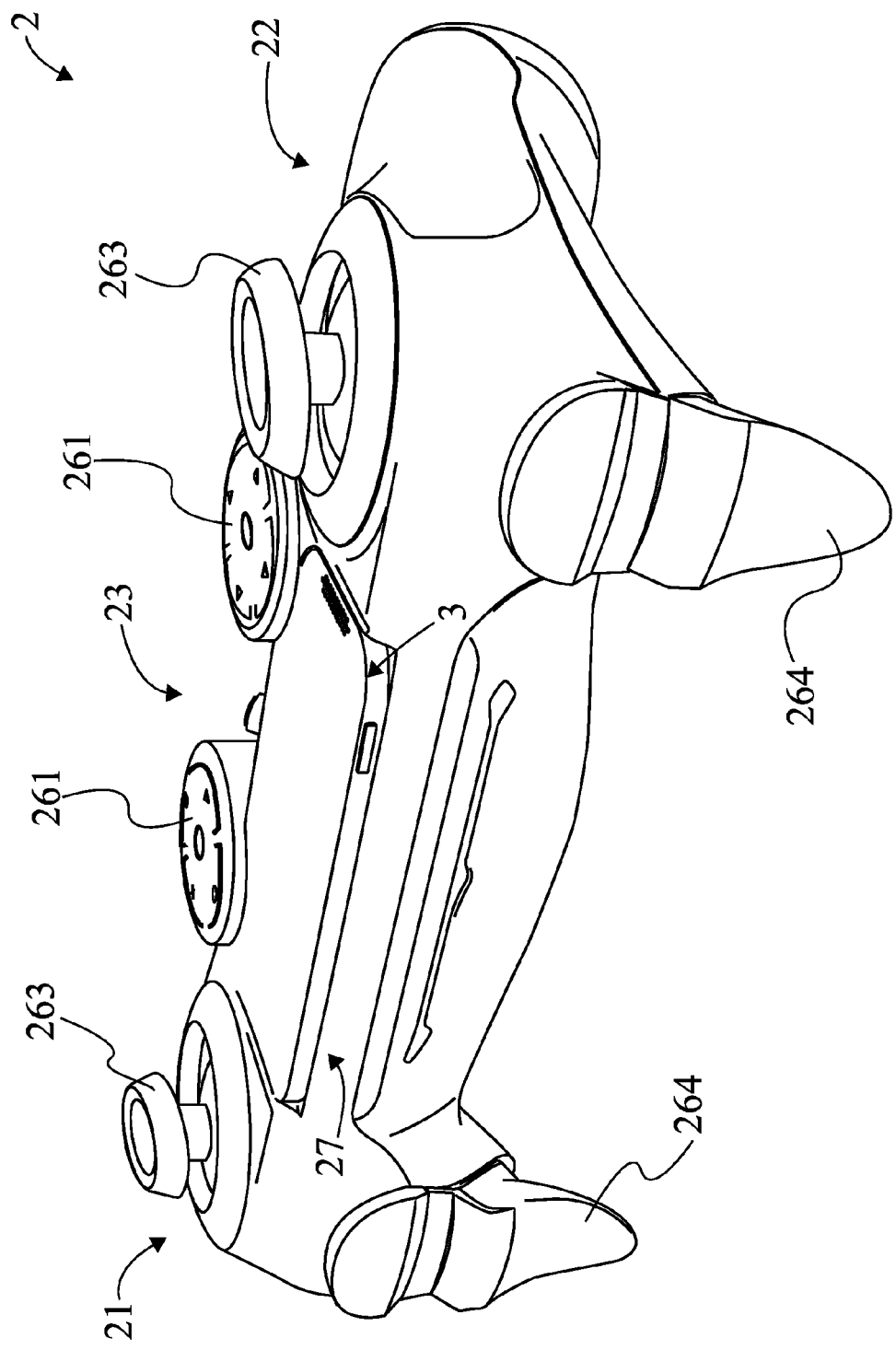
FIG. 9 is a perspective view showing a handheld controller of the present invention.
Figure 10:
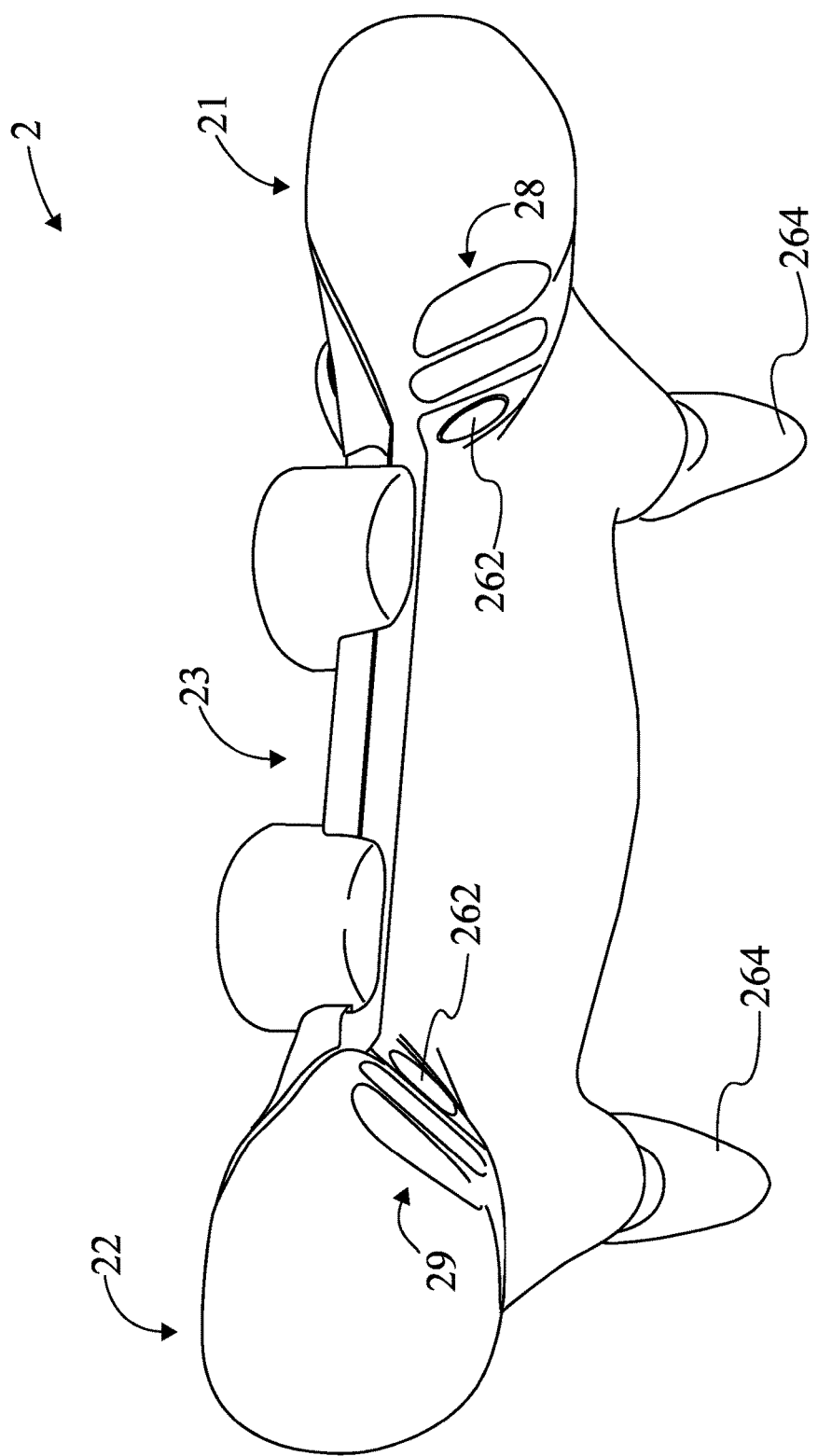
FIG. 10 is a bottom rear perspective view thereof.
Figure 11:
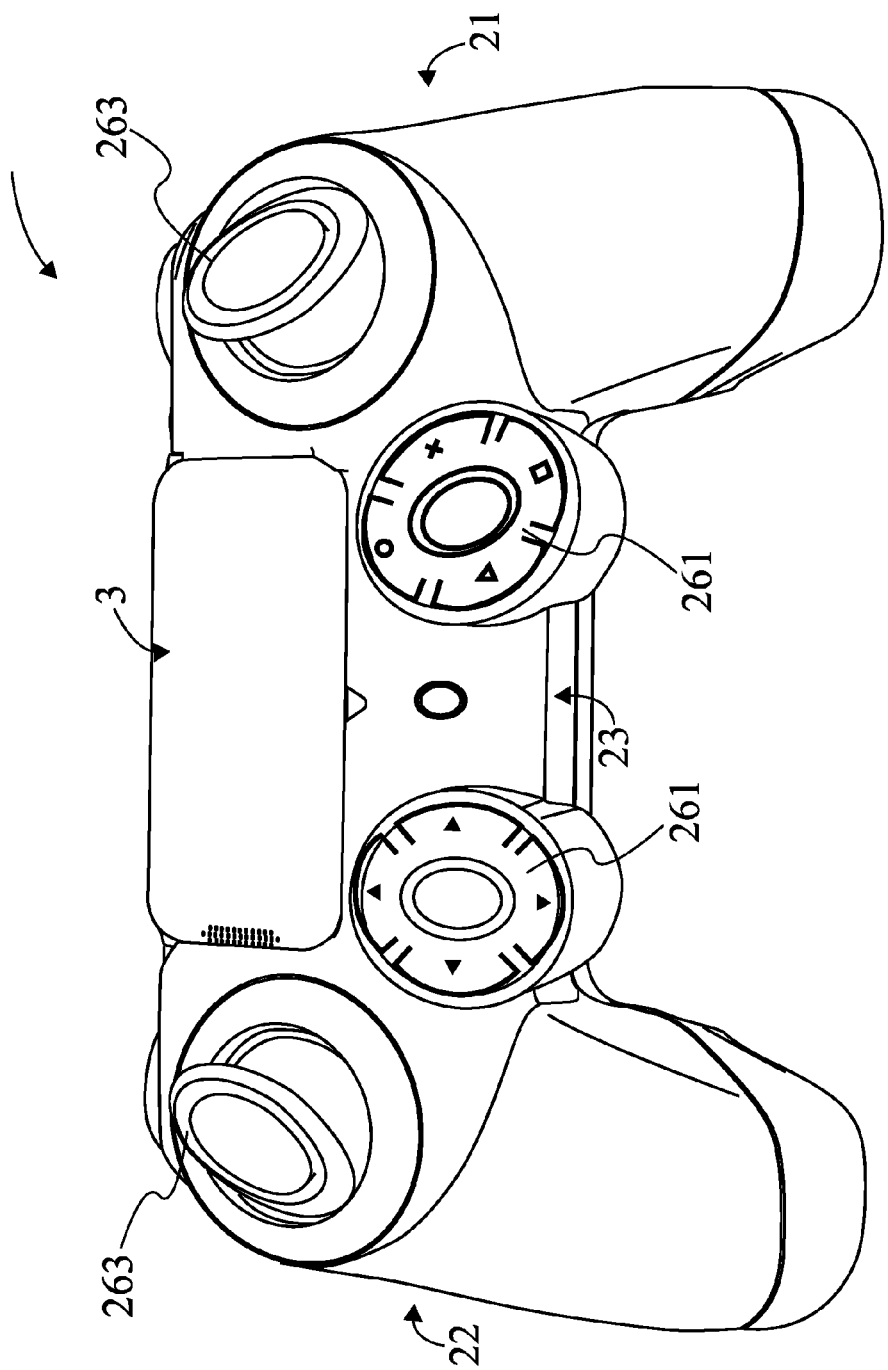
FIG. 11 is a top plan view thereof.
Figure 12:
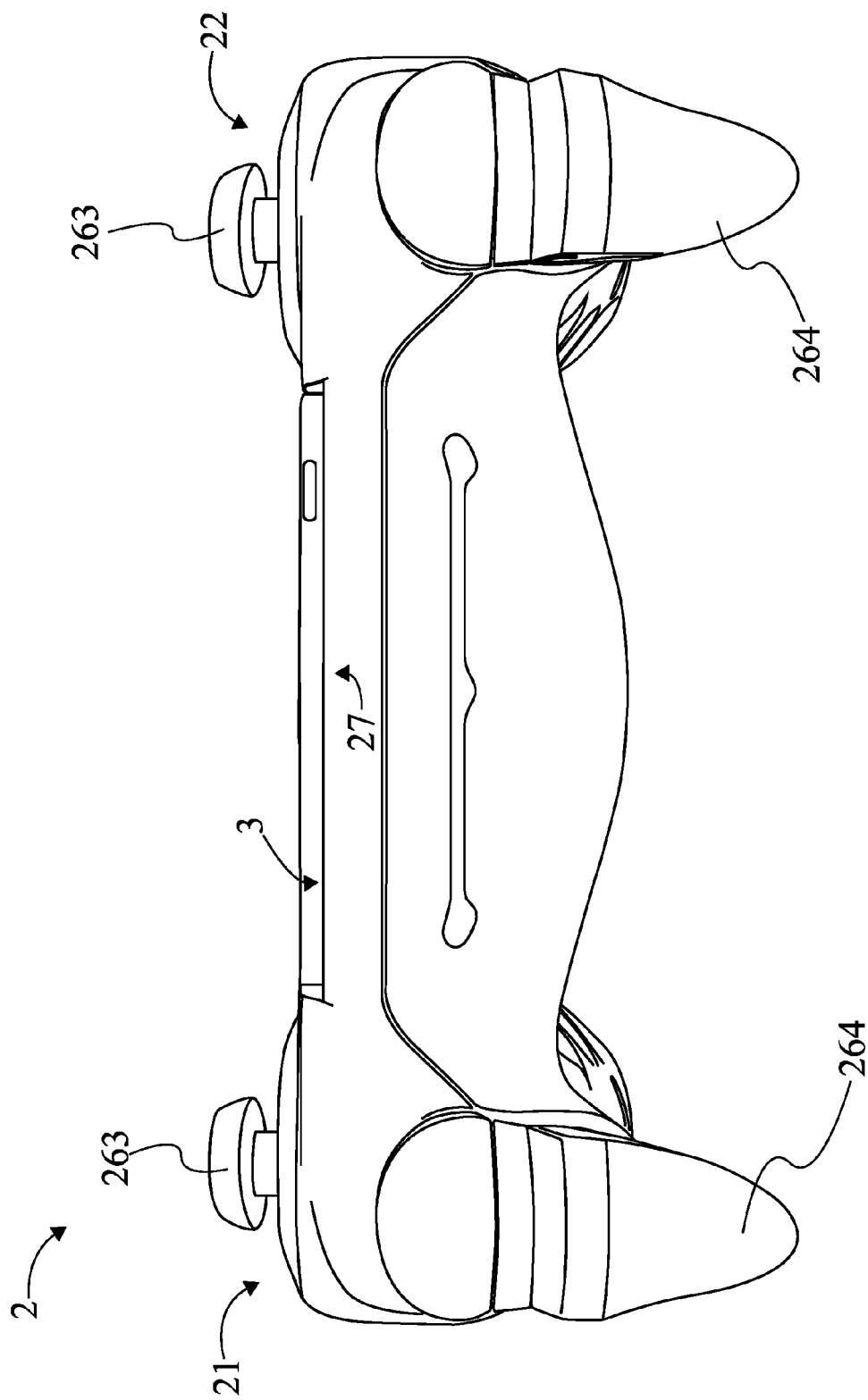
FIG. 12 is a front elevational view thereof.
Figure 13:
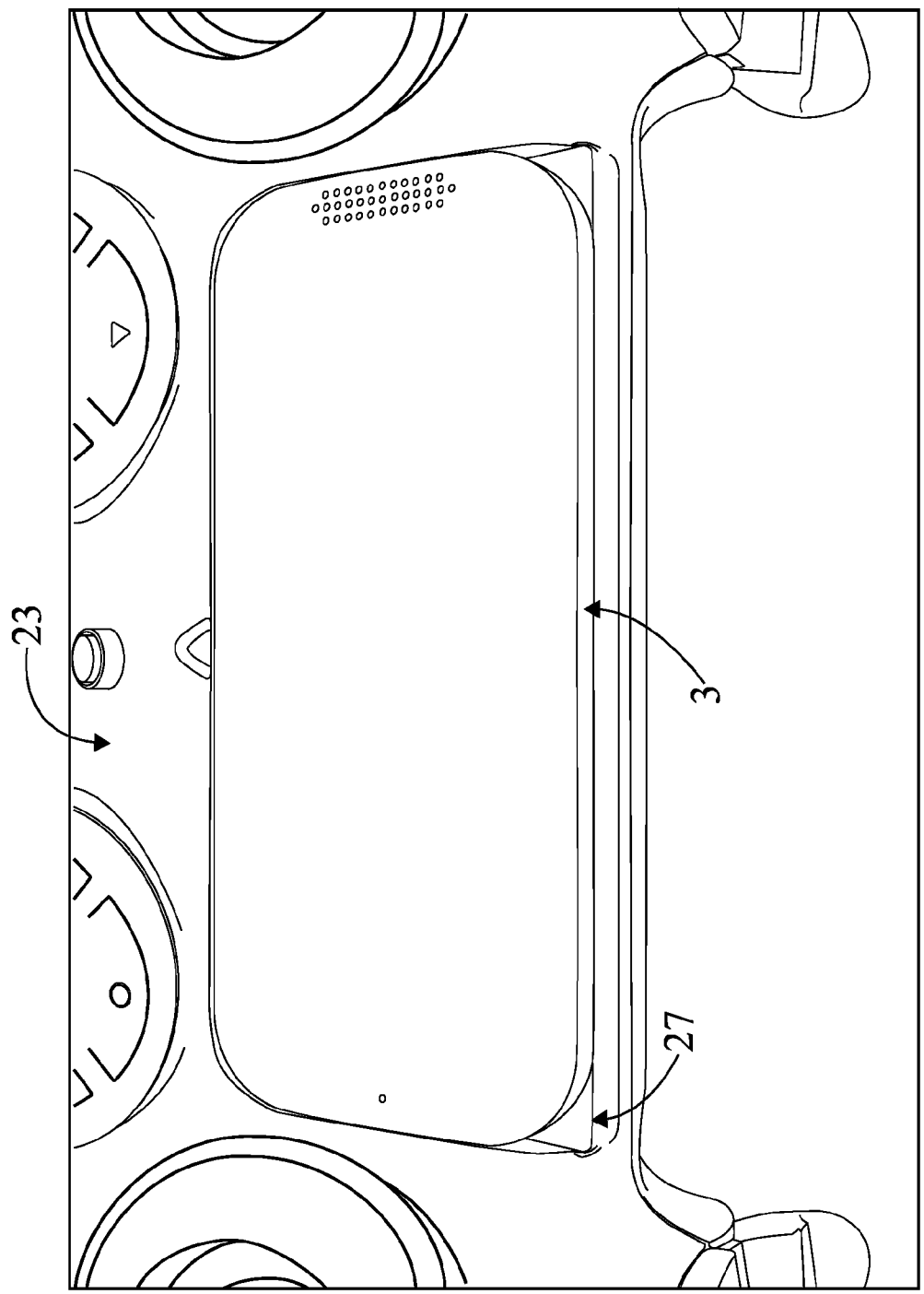
FIG. 13 is a magnified view showing a remote smart device docked with the handheld controller of the present invention.
Figure 14:
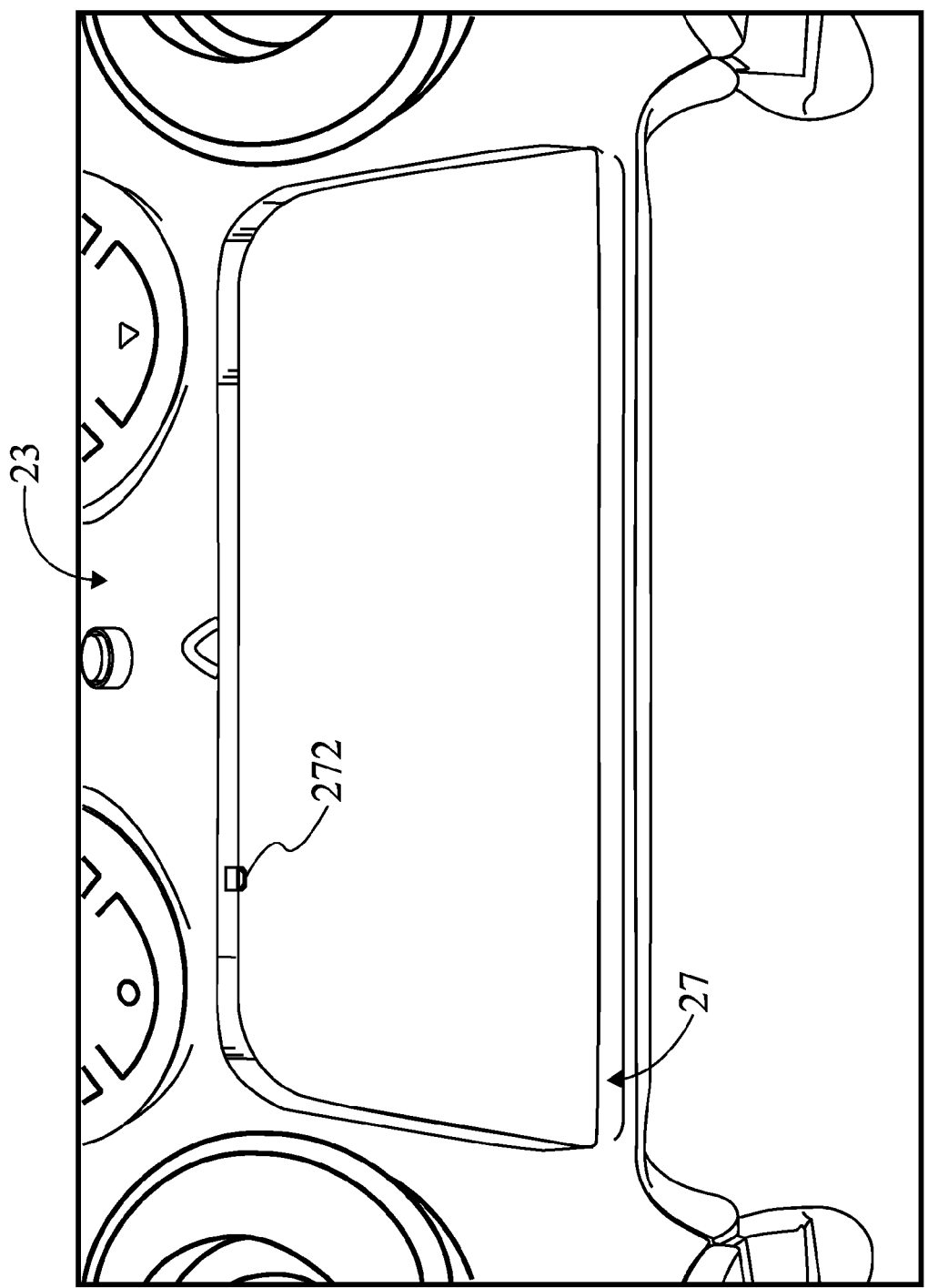
FIG. 14 is a magnified view showing a remote smart device receptacle of the handheld controller of the present invention.
Figure 15:
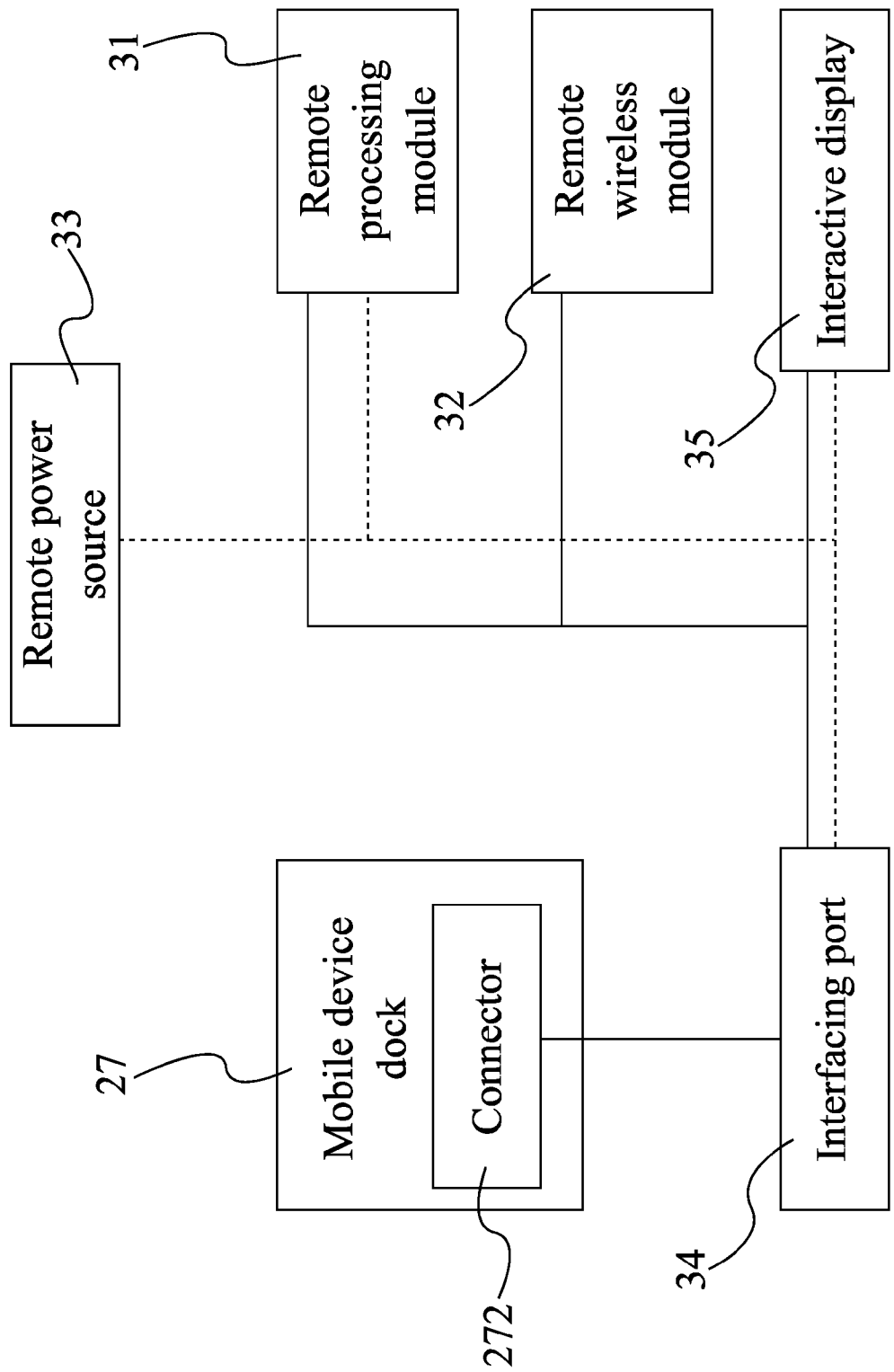
FIG. 15 is a diagram showing electrical and electronic connections of the handheld controller and the remote smart device of the present invention.
Figure 16:
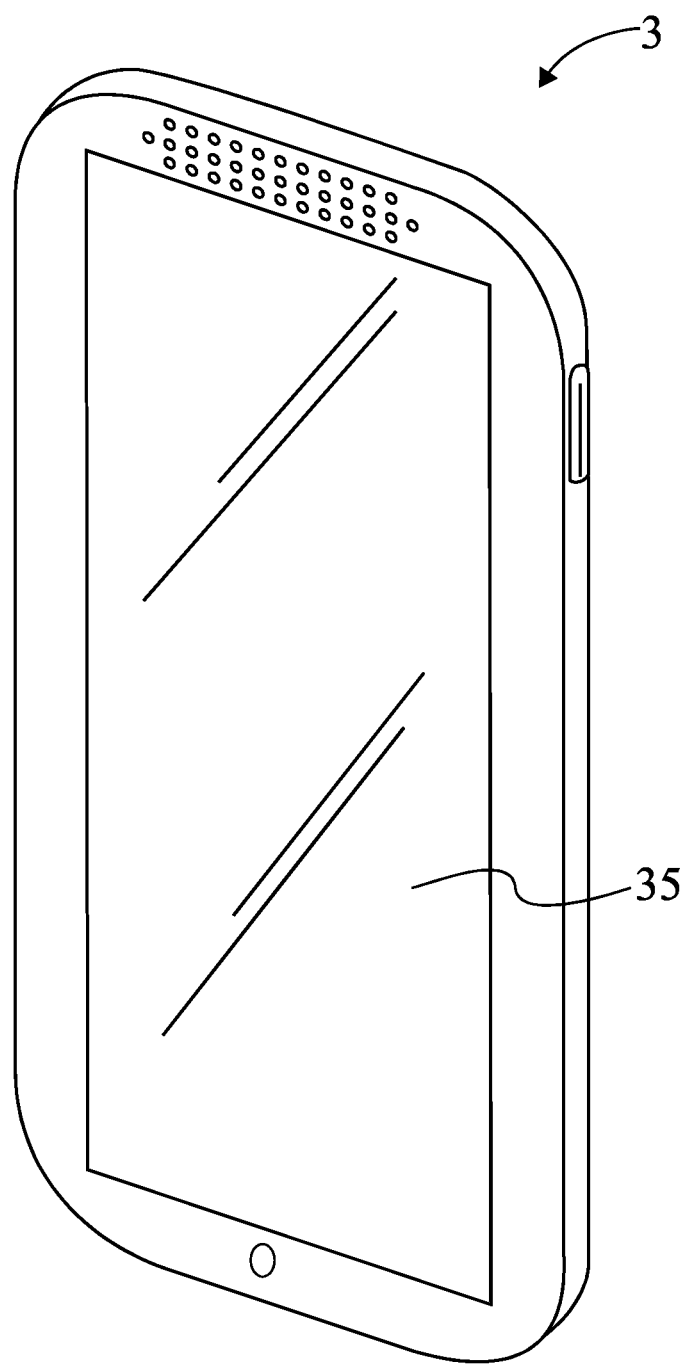
FIG. 16 is a perspective view showing the remote smart device of the present invention.
Figure 17:
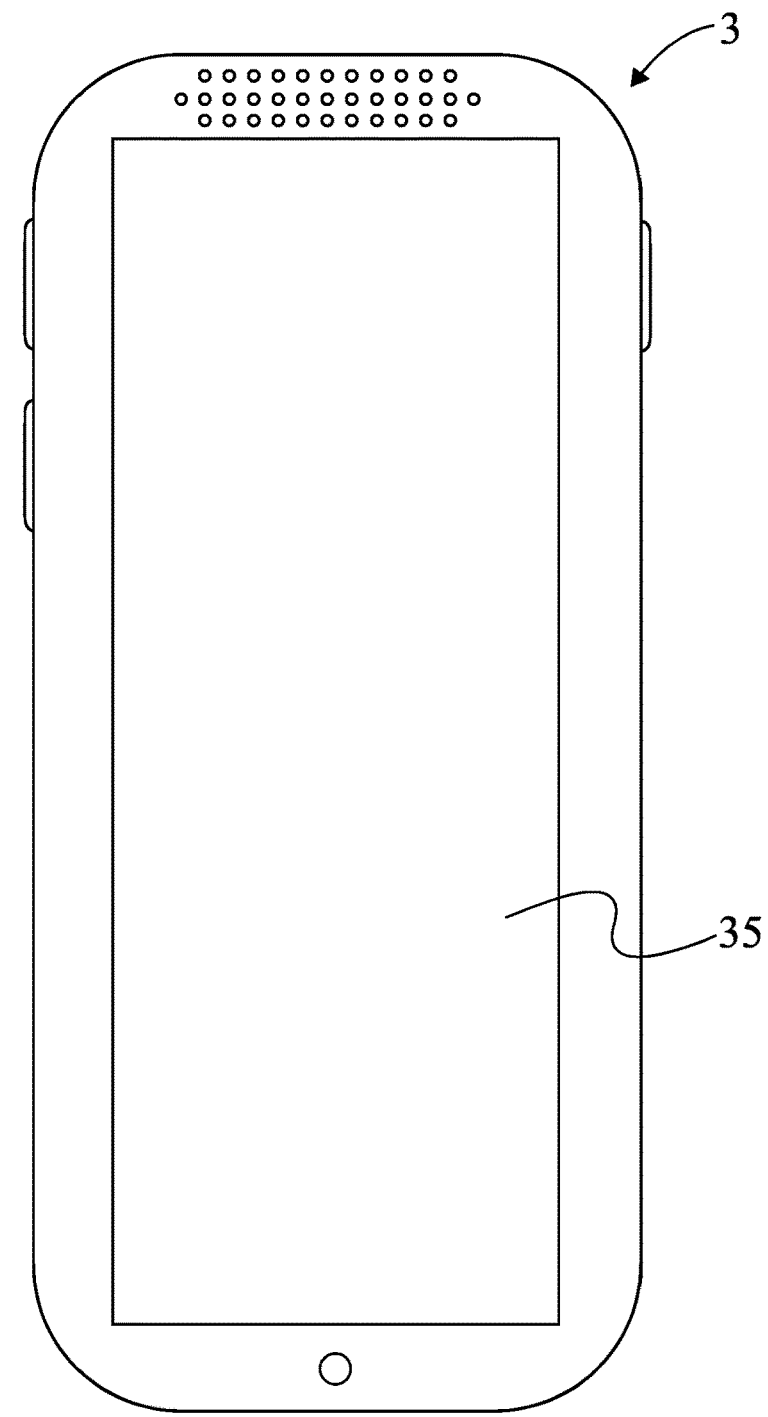
FIG. 17 is a front elevational view thereof.
Figure 18:
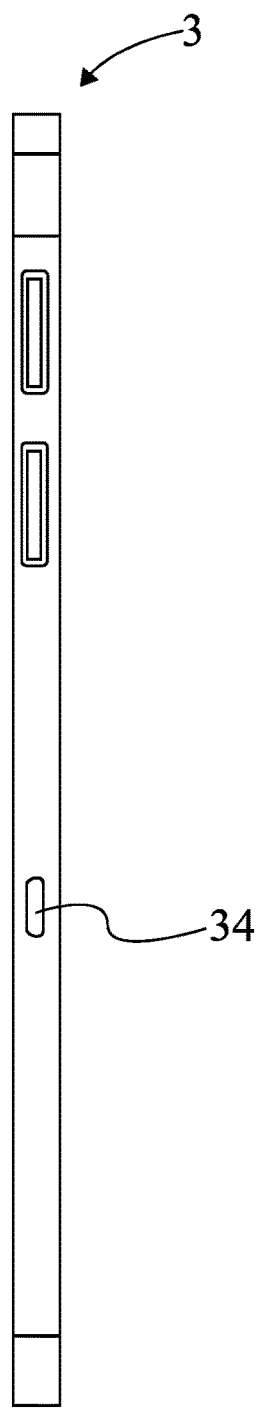
FIG. 18 is left-side elevational view thereof.
Figure 19:
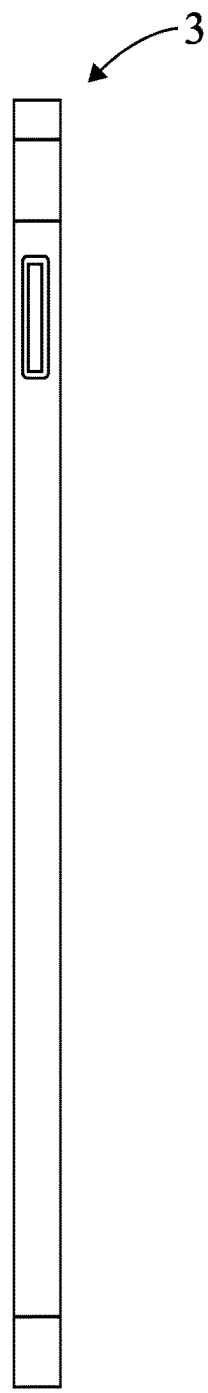
FIG. 19 is a right side elevational view thereof.

The present invention is a portable entertainment system which interfaces a base unit 1, a handheld controller 2, and a remote computing device 3 in order to form a fully functional micro console (once the remote computing device 3 has been connected). The result is a compact and easy to transport system. The created micro console affords users with a wide range of capabilities, some examples of which include but are not limited to playing video games and serving as an audio dock.

The present invention comprises a base unit 1, a handheld controller 2, and a remote computing device 3. The base unit 1 serves as a dock for the handheld controller 2 and the handheld controller 2 serves as a dock for the remote computing device 3. Further, the base unit 1 provides several capabilities for serving as a micro console, allowing for connections to be made with external power sources, audio-visual equipment, and data systems.

The base unit 1 comprises a frame 11, a universal docking system 12, a controller dock 13, an electronics system 14, and a base power system 15. The universal docking system 12, which receives the remote computing device 3, is integrated atop the frame 11. It is emphasized that the remote computing device 3 is preferably a "smartphone device", for example a personal smartphone or tablet. The universal docking system 12 allows for the position of the remote docking system to be adjusted as desired by a user, as necessary according to a specific smartphone device's connector placement and orientation. By placing the remote computing device 3 in the universal docking system 12 a user is able to use components of the base unit 1 in conjunction with the remote computing device 3. For example, the remote computing device 3 could output music to an audio system of the base unit 1.

The controller dock 13 allows the handheld controller 2 unit to be secured atop the base unit 1 when not in use, and as such is integrated atop the frame 11. The electronics system 14 and base power system 15 support computing function of the present invention, as described later, and are housed within the frame 11. The electronics system 14 itself comprises a base processing module 141 and a plurality of data ports 142. The base power system 15 is electrically connected to the base processing module 141 and plurality of data ports 142, in addition to the universal docking system 12. This allows for power to be supplied to electricity-dependent components as needed.

The handheld controller 2 comprises a first grip 21, a second grip 22, a central console 23, a first plurality of inputs 24, a second plurality of inputs 25, and a remote device dock 27. The first grip 21 and second grip 22 allow a person to grasp the handheld controller 2, and thus are connected on either side of the central console 23. The first plurality of inputs 24 and the second plurality of inputs 25 are placed on the central console 23, where they can easily be accessed by a user's fingers (most commonly the thumb) without requiring a user to release the first grip 21 or second grip 22. The remote device dock 27, which allows for a remote control to be directly interfaced with the handheld controller 2, is integrated into the central console 23.

As thus far described, the present invention provide an entertainment system which is created from a base unit 1, a handheld controller 2, and a remote computing device 3. Different functionalities are afforded to a user by docking the remote computing device 3 to the base unit 1 or to the handheld controller 2. Each of the these components, along with subcomponents, are subsequently described in more detail.

Regarding the universal docking system 12, the frame 11 comprises a supporting top surface 111 while the universal docking system 12 itself comprises a track 121, a carriage 122, a cradle 123, and a docking connector 124. The track 121 is positioned along the top surface 111 of the frame 11, preferably in a straight line adjacent to an upper edge of the frame 11. The track 121 receives a carriage 122, which is slidably engaged with the track 121. This allows for linear movement of the carriage 122 along the track 121. The cradle 123 is mounted to the top surface 111, while the docking connector 124 is adjacently connected to the carriage 122. The carriage 122 is provided to receive the remote computing device 3, while data and power can be transferred between the base unit 1 (specifically the electronics system 14 and base power system 15) and the remote computing device 3. Positional adjustments are possible thanks to the carriage 122 being slidably and rotatably engaged along the track 121. As a result, a user is always able to rotate their docked smart mobile device (e.g. smartphone or tablet) to face the front of the console, regardless of the orientation of the specific connector 272. The cradle 123 can then serve as a backrest for any docked smart mobile device. In short, when a remote computing device 3 is coupled to the universal docking system 12, a user is able to move and rotate the remote computing device 3 to a desired position and orientation.

In order to lock the carriage 122 in a desired position, the universal docking system 12 further comprises a plurality of stops 125 and a spring latch 126. The plurality of stops 125 is evenly distributed along the track 121 while the spring latch 126 is adjacently connected to the carriage 122. In an equilibrium position, the spring lack is pushed upwards, such that it is secured via one of the plurality of stops 125. Effectively, the carriage 122 cannot move because the spring latch 126 is blocked by the stop. A user can enable movement of the track 121 by pressing down on the spring latch 126, which disengaged the spring latch 126 from the stop and allows for the carriage 122 to be moved along the track 121 to a new desired position.

While the above describes the docking system of the preferred embodiment, alternative implementations remain possible within the scope of the present invention. For example, the spring latch 126 and stops 125 could potentially be replaced by a set screw that is placed in the carriage 122. Tightening or loosening of the set screw would then allow or prevent movement of the carriage 122 along the track 121. Another possibility is removal of the track 121 and carriage 122, instead opting for a fixed docking solution, though this reduces the versatility of the present invention. Other solutions not described remain possible as long as the universal docking system 12 is able to physically receive the remote computing device 3 and enable electrical and communicable connections between the remote computing device 3 and sub components of the base unit 1.

The controller dock 13, which supports the handheld controller 2, comprises a first indent 131, a second indent 132, and a central indent 133. These indents are contoured to match the first trigger 264, second trigger 264, and central console 23 of the handheld controller 2. Each indent is positioned into the top surface 111 of the frame 11, creating a cavity that fits the corresponding component of the handheld controller 2. More specifically, the central indent 133 is shaped to receive the main body of the handheld controller 2 (e.g. the central console 23). This central indent 133 is positioned between the first indent 131 and the second indent 132, which are shaped to receive the first grip 21 and the second grip 22, respectively. It is noted that the alterations are possible to the controller dock 13. For example, a single indent could be positioned along the top surface 111, with the two grips and main body of the handheld controller 2 sharing the single cavity. While such alternative options exists, the first indent 131, second indent 132, and central indent 133 are preferred due to providing a more secure docking solution for the handheld controller 2.

To provide a user with access to the electronics system 14, and more specifically the plurality of data ports 142, the frame 11 comprises a lateral surface 112 and a panel 113. The panel 113 is a door which is hingedly connected to the lateral surface 112, with the axis of rotation being positioned adjacent to a base of the frame 11. The plurality of data ports 142 is mounted to the interior of the panel 113; as a result, when the panel 113 is closed, the data ports 142 are hidden. This helps create a more aesthetically appealing and cleaner appearance for the base unit 1 when the data ports 142 are not needed.

Preferably, to help open the panel 113 to access the data ports 142, a groove is positioned into the lateral surface 112 adjacent to the top of the panel 113. This groove allows a user to place their finger beneath the interior face of the panel 113. This makes it easier for a user to pull on the panel 113 without adding external elements, such as a tab, that might detract from the aesthetics of the present invention.

To hold the panel 113 in an open position, a ratchet system is provided, such that the panel 113 can be held in different states (for example closed, partially open, or fully open) without requiring a user to actively hold the panel 113. Addressing the plurality of data ports 142, the present invention preferably includes a universal serial bus (USB) port, a 3.5 mm audio jack, a High-Definition Multimedia Interface (HDMI), and an Ethernet port. It is also preferable to provide an HDMI connector 272 which employs screencasting, enabling peer-to-peer connections of standard wireless networks. An example standard for such HDMI-Display connections is Miracast. However, different ports and standards are compatible with the present invention. For example, the USB port could be Type B or Type C. Further, the connector 272 could be of the micro, mini, or "standard" size. Examples of further potential ports include display port and a Secure Digital (SD) card slot.

The data ports 142 can be enabled through various standards, the most common of which are the Mobile High-definition Link (MHL) standard and the SlimPort standard. The use of MHL and SlimPort standards is advantageous as it simplifies construction of the present invention. Rather than having to individually configure each connection, an internal adapter for each standard (i.e. one MHL adapter and one SlimPort adapter) can be installed within the base unit 1. This improves compatibility of the present invention, as devices that utilize either of the standards can be interfaced with the present invention. Additionally, the MHL and SlimPort adapters allow for docked devices to be recharged.

In the preferred embodiment of the present invention, it is preferable for mirror-imaging apabilities to be provided via the MHL standard link connection. This serves as an audio-visual interface that allows consumers to connect mobile phones, tablets, or other smart devices to high-definition displays and audio receivers.

While the preferred embodiment includes a panel 113 for keeping the plurality of data ports 142 hidden when not in use, other embodiments may omit the panel 113. For these embodiments, the plurality of data ports 142 is positioned directly into a lateral surface 112 of the frame 11. Other configurations of the data ports 142 relative to the frame 11 are possible as long as the data ports 142 retain their connection to the base processing module 141 and the base power system 15.

Preferably, the electronics system 14 also comprises a base wireless module 143. This base wireless module 143 enables wireless communications with proximal devices. The base wireless module 143 is electronically connected to the base processing module 141 and the plurality of data ports 142, allowing the base wireless module 143 to transmit data from said components. The base wireless module 143 is powered via an electrical connection with the base power system 15. Ideally, the base wireless module 143 is implemented as a Bluetooth connection. Potentially, said Bluetooth connection could be augmented by or replaced by other standards, such as WiFi networks.

To allow the base unit 1 to serve as a multimedia dock, it preferably comprises a plurality of audio speakers 16. The plurality of audio speakers 16 is mounted into the fradme 11, allowing for audio content received from the base processing module 141 to be output in proximity of the base unit 1. The number of speakers can be varied in different embodiments of the present invention. For example, in the preferred embodiment two speakers are positioned at either side of the top surface 111, while a bass speaker is positioned at a bottom portion of the frame 11. Preferably, the bottom portion is slightly elevated from a supporting surface (for example by small supports) to help provide better acoustics from the bass speaker. Docked devices, such as the remote computing device 3, can thus make use of the plurality of audio speakers 16 and other electronic connections of the base unit 1.

The base power system 15 is split into two sub components, namely a power unit 151 and a wireless power transfer unit 152. The power unit 151 can be a battery (effectively an internal power source) or an adapter for a wall socket connection (effectively an external power source). Potentially, both options could be provided to allow the present invention to operate via battery power normally, but be plugged into a wall socket when available or needed to recharge the battery. The wireless power transfer unit 152 is housed in the frame 11, next to the controller dock 13. This wireless power transfer unit is thus able to recharge a handheld controller 2 that is position into the controller dock 13, without requiring a direct electrical connection. The wireless power transfer unit 152 simultaneously charges the remote computing device 3 via the docked handheld controller 2. The exact method of wireless power transfer is not restricted by the present invention; as an example, inductive charging could be used, but others are equally suitable. The primary concerns with the wireless charging method will be cost, availability, and lifespan.

Moving on to describe the handheld controller 2 in more detail, the remote device dock 27 comprise a recess 271 and a remote connector 272. The recess 271 is a planar depression formed in the central cavity, into which the remote computing device 3 can easily be inserted. The remote connector 272 plugs into the remote computing device 3, allowing for communications between the handheld controller 2 and the remote computing device 3. The remote device mount is allows the remote computing device 3 to be positioned flush with the handheld controller 2. Effectively, the mobile computing device serves as a screen for the handheld controller 2. The result is similar to existing handheld gaming consoles, though they lack the adaptability of the present invention.

The first plurality of inputs 24 and the second plurality of inputs 25 are provided for the first grip 21 and the second grip 22, respectively. As such, the first plurality of inputs 24 is mounted to the first grip 21 while the second plurality of inputs 25 is mounted to the second grip 22. Each plurality of inputs provides several input mechanisms, examples of specific input mechanisms and locations being described in more detail later. Providing multiple inputs allows a user to simultaneously use both hands, as well as multiple digits of each hand, to operate the handheld controller 2.

The handheld controller 2 serves as a primary interface for a user and, when used in combination with the mobile computing devices, essentially acts as a handheld entertainment console. To facilitate this, there are a number of components and configurations which are preferably implemented with the handheld controller 2. Resultantly, the handheld controller 2 preferably comprises a first plurality of ergonomic finger grooves 28 and a second plurality of ergonomic finger grooves 29. The first plurality of ergonomic finger grooves 28 is positioned into a base surface of the first grip 21. Similarly, the second plurality of ergonomic finger grooves 29 is positioned into a base surface of the second grip 22. These finger grooves are formed at the bottom of the handheld controller 2 and are contoured to receive a person's fingers. The finger grooves make the handheld controller 2 more comfortable to grasp, especially over extended periods of time. This ultimately improves user comfort and helps create a positive experience with regards to the present invention.

Further, the first plurality of finger grooves and the second plurality of finger grooves can be used to provide additional inputs for the handheld controller 2. Thus, the first plurality of inputs 24 and the second plurality of inputs 25 each comprise an 262. This 262 is mounted into one of the finger grooves on the bottom of the controller, with at least one button being provided for each plurality of finger grooves. Thus, an 262 of the first plurality of inputs 24 is mounted into one of the finger grooves of the first grip 21, while an 262 of the second plurality of inputs 25 is mounted into one of the finger grooves of the second grip 22.

To provide multi-axis input capabilities, the first plurality of inputs 24 and the second plurality of inputs 25 each comprise an analog stick 263. Each analog stick 263 (i.e. one from the first plurality of inputs 24 and one from the second plurality of inputs 25) is pivotally mounted to the handheld controller 2. More specifically, one analog stick 263 is mounted to the first grip 21, next to the central console 23, while another analog stick 263 is mounted to the second grip 22, on the other side of the central console 23. This pivotal connection allows for the analog stick 263s to be used to provide input along two axes, useful for providing directional input for motion in video games. Further, to improve ergonomics of the analog stick 263s, each analog stick 263 preferably comprises a head and an indent. The indent is positioned into the head, forming an oval shaped groove which comfortably receives a user's fingertip.

Potentially, the first plurality of inputs 24 and the second plurality of inputs 25 each comprise a trigger 264. Each trigger 264 is laterally mounted into its corresponding grip. Thus one trigger 264 is mounted into the first grip 21 and another trigger 264 is mounted into the second grip 22. Preferably, the trigger 264s are curved so that a user can slide their finger along each trigger 264 to provide a finer level of control, especially as compared to an alternative straight trigger 264. A further benefit derived from the configuration of the present invention is the reverse trigger 264ing implementation. That is, the contours of the trigger 264s allow a user to easily access upper triggers (colloquially referred to as L-1 and R-1, short for left-1 and right-1) by sliding their fingers upwards from the lower triggers (colloquially referred to as L-2 and R-2, short for left 2 and right 2).

Too, it is possible for the first plurality of inputs 24 and the second plurality of inputs 25 to each comprise a plurality of buttons 261. Each plurality of buttons 261 is configured in a circular pattern, allowing a user's finger to easily switch between different buttons. Positioned between the plurality of buttons 261 is a finger indent, where a user can rest their finger when not actively engaging one of the plurality of buttons 261. Each plurality of buttons 261 is positioned flat on the handheld controller 2, with the a slight curvature towards the finger indent (which serves as a thumb rest center position). As with other inputs described to this point, two separate groups of buttons, with one plurality of buttons 261 being mounted to the first grip 21 and another plurality of buttons 261 being mounted to the second grip 22.

Preferably, the handheld controller 2 also comprises a vibration engine for the purposes of haptic feedback; this improves tactile sensations, especially as related to playing video games or running other interactive programs via the present invention.

Overall, the plurality of inputs provides a user with multiple options for interacting with the handheld controller 2. For example, one finger could be pressing a trigger 264 while another finger could be manipulating a trigger 264, pressing a button, or otherwise interacting with the handheld controller 2. It is noted that different configurations and combinations of inputs remain possible within the scope of the present invention. The primary purpose of the plurality of inputs is to enable a user to interact with a docked mobile computing device by means of the handheld controller 2.

The mobile computing device acts as the brains of the present invention; any electronic device can be utilized for this purpose by installing a software application. The software application allows the mobile computing device to directly interact with the base unit 1 and the handheld controller 2. Resultantly, the present invention can be used to play video games, manage multimedia content, or perform further functions as desired by a user. Preferably, the mobile computing device comprise a remote processing module 31, a remote wireless module 32, a remote power source 33, an interfacing port 34, and an interactive display 35. The remote processing module 31 allows the remote computing device 3 to run software applications which are output to the interactive display 35. The remote wireless module 32 allows for the mobile computing device to communicate with other electronic devices without having a direct physical connection. This allows, for example, the remote computing device 3 to use the base unit 1 (by means of the base wireless module 143) as an access point via a wireless local area network connection or a Bluetooth connection. The remote power source 33 is electrically connected to the remote processing module 31, remote wireless module 32, interfacing port 34, and interactive display 35 to provide the energy necessary for operation. Further, the remote power source 33 can be recharged when docked, thanks to the electrical connection with the interfacing port 34.

The remote device can be docked with either the base unit 1 or the handheld controller 2, by means of the universal docking system 12 or remote device dock 27 as earlier described. For example, the remote computing device 3 can be coupled with the base unit 1 through the universal docking system 12, with the interfacing port 34 of the remote computing device 3 receiving the docking connector 124 of the universal docking system 12. Alternatively, the remote computing device 3 can directly dock with the handheld controller 2 by means of the remote device dock 27. In this example, the interfacing port 34 of the remote computing device 3 receives the remote connector 272 of the handheld controller 2, allowing the two to be used together as a handheld console.

Additional components which are desirable for the present invention include an illuminated strip ("lighting connection array") which is positioned around part of the base unit 1 and the handheld controller 2. These illuminated strips can be configured to light up when the corresponding component is in use. Alternatively, the illuminated strips could be configured to remain lit at all times, or allow a user to switch them on or off. Other preferred features are the provisional of interface controls for the base unit 1, handheld controller 2, and remote computing device 3. More specifically, a power button is ideally provided for each unit to facilitate turning the respective unit off or on. Further, the remote computing device 3 preferable has volume controls, placed on the side of the unit where a user can access them even when docked into the handheld controller 2. The remote computing device 3 also has a microphone that allows for audio input (e.g. speaking) to be received from a user and (for example) transmitted to another device or person.

Resulting from the configuration of components, the present invention offers several benefits over existing solutions. Most notably, the present invention is not merely a docking station, but instead provides a combination of multimedia (e.g. audio played from the speakers) output capabilities, offers media connections (e.g. the 3.5 mm jack and the HDMI port), and serves as an access point (via the Ethernet port and wireless modules), all of which are made available to a docked or otherwise coupled mobile computing device. Further, by providing both MHL adapters, the present invention supports outputting of audio-visual data. In addition, these adaptors enable mirror imaging, allowing multimedia output from the mobile computing device to be displayed to a television or other electronic device. The mobile computing device, when installed with the appropriate software, is able to control features of both the base unit 1 and the handheld controller 2. For example, the application can be used to control haptic feedback intensity, the mapping of buttons on the controller, default Bluetooth devices to pair with, and so on. Thanks to attention to ergonomics (e.g. the finger grooves of the handheld controller 2), the result is a multipurpose and user friendly electronic system with a wide range of applications.

Although the invention has been explained in relation to its preferred embodiment, it is to be understood that many other possible modifications and variations can be made without departing from the spirit and scope of the invention as hereinafter claimed.

What is claimed is:

1. A portable entertainment system comprising:
   a handheld controller;
   a remote computing device;
   the handheld controller comprising a first grip, a second grip, a central console, a plurality of first ergonomic finger grooves, a plurality of second ergonomic finger grooves, a plurality of first inputs, a plurality of second inputs, a vibration engine and a remote device dock;
   the central console being connected in between the first grip and the second grip;
   the plurality of first ergonomic finger grooves being positioned into a first base surface of the first grip;
   the plurality of second ergonomic finger grooves being positioned into a second base surface of the second grip;
   the plurality of first inputs comprising a plurality of first buttons, a first analog stick and a first trigger;
   the plurality of first buttons being mounted onto the central console;
   the plurality of first buttons being adjacently located to the first grip;
   the plurality of first buttons being arranged in a first elliptical pattern;
   the first analog stick being pivotally mounted to the first grip;
   the first analog stick comprising a first head and a first indent;
   the first indent being positioned into the first head;
   the first head and the first indent each being elliptically shaped;
   the first trigger being laterally mounted into the first grip;
   the plurality of second inputs comprising a plurality of second buttons, a second analog stick and a second trigger;
   the plurality of second buttons being mounted onto the central console;
   the plurality of second buttons being adjacently located to the second grip;
   the plurality of second buttons being arranged in a second elliptical pattern;
   the second analog stick being pivotally mounted to the second grip;
   the second analog stick comprising a second head and a second indent;
   the second indent being positioned into the second head;
   the second head and the second indent each being elliptically shaped;
   the second trigger being laterally mounted into the second grip;
   the vibration engine being configured to provide a haptic feedback;
   the remote device dock comprising a recess and a remote connector;
   the recess being positioned into the central console;
   the remote connector being removably docked to the handheld controller;
   the remote computing device being removably inserted into the recess;
   the remote computing device comprising an interfacing port and an interactive display;
   the interfacing port and the interactive display being electrically connected to each other;
   the interfacing port being removably engaged with the remote connector;
   a base unit;
   the base unit comprising a frame, a universal docking system, a controller docking system, an electronics system and a base power system;
   the universal docking system being integrated atop the frame;
   the controller docking system being integrated atop the frame;
   the electronics system being housed within the frame;
   the base power system being housed within the frame;
   the electronics system comprising a base processing module and a plurality of data ports;
   the base power system being electrically connected to the base processing module, the plurality of data ports and the universal docking system;
   the frame comprising a top surface;
   the universal docking system comprising a track, a carriage, a cradle and a docking connector;
   the track being positioned along the top surface;
   the carriage being slidably engaged with the track;
   the cradle being centrally mounted to the top surface;
   the cradle being adjacently positioned to the track;
   the docking connector being adjacently connected to the carriage;
   the base power system being electrically connected to the docking connector; and
   the electronics system being communicably coupled to the docking connector.

2. The portable entertainment system as claimed in claim 1 comprising:
   the universal docking system comprising a plurality of stops and a spring latch;
   the plurality of stops being distributed along the track;
   the spring latch being adjacently connected to the carriage; and
   the spring latch being selectively engaged with one of the plurality of stops, wherein engagement of the spring latch with one of the plurality of stops prevents movement of the carriage along the track.

3. The portable entertainment system as claimed in claim 1 comprising:
   the controller docking system comprising a first frame indent, a second frame indent and a central frame indent;
   the first frame indent, the second frame indent and the central frame indent each being positioned into a top surface of the frame; and
   the central frame indent being positioned in between the first frame indent and the second frame indent, wherein the first frame indent is operatively disposed to receive the first grip, the second frame indent is operatively disposed to receive the second grip, and the central frame indent is operatively disposed to receive the central console.

4. The portable entertainment system as claimed in claim 1 comprising:
   the frame comprising a lateral surface and a panel;
   the panel being adjacently positioned to the lateral surface;
   the panel being hingedly connected to the lateral surface; and
   the plurality of data ports being mounted to the panel.

5. The portable entertainment system as claimed in claim 1 comprising:
   the electronics system comprising a base wireless module;

the base wireless module being electronically connected to the base processing module and the plurality of data ports; and the base power system being electrically connected to the base wireless module.

6. The portable entertainment system as claimed in claim 1 comprising:

the base unit comprising a plurality of audio speakers;

the plurality of audio speakers being mounted into the frame;

the base processing module being electrically connected to the plurality of audio speakers; and the base power system being electrically connected to a base wireless module.

7. The portable entertainment system as claimed in claim 1 comprising:

the base power system comprising a power unit and a wireless power transfer unit;

the power unit being electrically connected to the wireless power transfer unit; and the wireless power transfer unit being housed adjacent to the controller docking system.

8. The portable entertainment system as claimed in claim 1 comprising:

the remote connector being operatively disposed to plug into the remote computing device.

9. The portable entertainment system as claimed in claim 1 comprising:

the plurality of first inputs comprising a first auxiliary button;

the second plurality of inputs comprising a second auxiliary button;

the first auxiliary button being mounted into one of the plurality of first ergonomic finger grooves; and the second auxiliary button being mounted into one of the plurality of second ergonomic finger grooves.

10. The portable entertainment system as claimed in claim 1 comprising:

the handheld controller comprising a controller power unit;

the controller power unit being housed within the central console; and the controller power unit being electrically connected to the remote device dock.

11. The portable entertainment system as claimed in claim 1 comprising:

the remote computing device comprising a remote processing module, a remote wireless module, a remote power source; and the remote power source being electrically connected to the remote processing module, the remote wireless module, the interfacing port and the interactive display.

12. The portable entertainment system as claimed in claim 1 comprising:

the remote computing device being removably docked to the base unit;

the remote computing device being removably coupled with the universal docking system; and the interfacing port being removably engaged with a docking connector of the universal docking system.

* * * * *